United States Patent Office 3,410,820
Patented Nov. 12, 1968

3,410,820
ROOM TEMPERATURE VULCANIZING COMPOSITIONS
John F. Harrod, Saratoga, N.Y., assignor to General Electric Company, a corporation of New York
No Drawing. Filed Aug. 1, 1966, Ser. No. 569,105
12 Claims. (Cl. 260—37)

ABSTRACT OF THE DISCLOSURE

A method of curing organosilicon polymers containing hydroxyphenyl groups by means of an oxidative coupling reaction which is catalyzed by a basic copper salt-pyridine complex and to the compositions produced thereby. The compositions are useful as encapsulating agents, caulking compositions and the like.

---

It is known that certain hydroxyphenyl compounds can be oxidatively polymerized to yield high molecular weight polyphenylene oxide compounds by means of oxygen in the presence of a catalyst comprising a basic copper-salt-tertiary amine complex.

Unexpectedly, it has been discovered that organosilicon compounds containing a (hydroxyphenyl)alkylene group can be oxidized by oxygen (either atmospheric oxygen or gaseous oxygen) in the presence of certain basic copper-salt pyridine or basic copper-salt-substituted pyridine complexes to yield higher molecular weight compositions and in some instances, cured elastomeric and crosslinked resinous organosilicon compositions. It has further unexpectedly been found that this curing takes place in a short period of about 20–30 minutes at normal room temperatures, i.e., from about 10° C. to about 35° C.

The poly(phenylene oxide)organosilicon compounds included in this invention are the silanes, siloxanes and copolymeric siloxanes. These poly(phenylene oxide)organosilicon compounds are those having the general formula I.
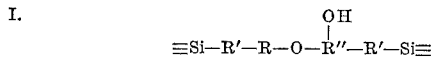

where R is a divalent phenylene or substituted phenylene radical containing at least one hydrogen in the ring, R" is a divalent phenylene radical or substituted phenylene radical, R' is a $C_nH_{2n}$ group where $n$ is an integer having a value of from 0 to 18 or more and each free valence of each silicon atom is interconnected to a member of the class consisting of monovalent hydrocarbon radicals free of aliphatic unsaturation, a halogenated monovalent hydrocarbon radical free of aliphatic unsaturation, a cyanoalkyl radical and oxygen, said oxygen being connected to no other group than a monovalent hydrocarbon free of aliphatic unsaturation, a halogenated monovalent hydrocarbon radical free of aliphatic unsaturation and silicon of a siloxane grouping, all other free valences of all silicon atoms being satisfied by monovalent hydrocarbon radicals free of aliphatic unsaturation, halogenated monovalent hydrocarbon radicals free of aliphatic unsaturation and cyanoalkyl groups.

Included in the organosilicon compounds of Formula I are organosilanes, organosiloxanes and copolymeric organosiloxanes. The organosilanes included in Formula I are those of the formula II.
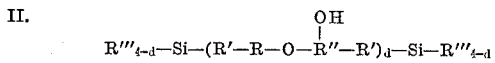

wherein R, R' and R" have the above-defined meanings, R''' is an organic radical free of aliphatic unsaturation and is selected from the class consisting of monovalent hydrocarbon radicals, halogenated monovalent hydrocarbon radicals, cyanoalkyl radicals, monovalent hydrocarbonoxy radicals, and halogenated monovalent hydrocarbonoxy radicals, and $d$ is an integer having a value of from 1 to 3.

The organosiloxanes included in Formula I are those containing units of the formula III.
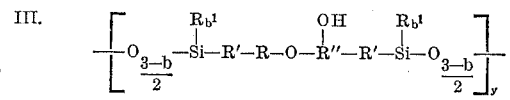

where R, R' and R" have the above-defined meanings, $R^1$ is a monovalent hydrocarbon radical free of aliphatic unsaturation, a halogenated monovalent hydrocarbon radical free of aliphatic unsaturation or a cyanoalkyl radical, $b$ is an integer of from 0 to 2 and $y$ is an integer of at least 1, e.g., as high as 10,000 or even higher.

The copolymeric organosiloxanes included in Formula I are those containing units of the formula IV.
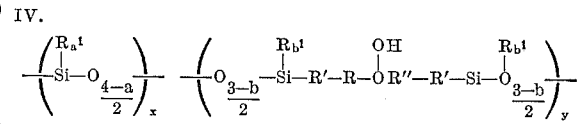

where R, R', R", $R^1$, $b$ and $y$ have the above-defined meanings, $a$ is an integer of from 1 to 3, and $x$ is an integer having a value of at least 1, and can be 10,000 or even higher.

Radicals included by R are, for example, divalent phenylene radicals and substituted divalent phenylene radical containing up to 3 substituents such as chlorophenylene, 2,3,5-trichlorophenylene, tolylene, xylylene, 2-chloro-3,5-dimethylphenylene, 3,5-dibutylphenylene, 3,5-dibenzylphenylene and the like; divalent alkoxy-substituted phenylene radicals such as methoxyphenylene, ethoxyphenylene, ethoxytolylene and the like; nitrated divalent phenylene radicals such as nitrophenylene, nitrotolylene, nitroxylylene and the like.

Radicals included by R' are, for example, divalent aliphatic radicals of the formula $C_nH_{2n}$ where $n$ is as above-defined and containing 1 to 18 or more carbon atoms such as methylene and the isomeric forms of ethylene, propylene, butylene, pentylene, hexylene, octylene, octadecylene, etc. It is of course obvious that when $n$ equals 0, the R group is directly connected to the silicon atom.

Radicals included by

are the nuclearly hydroxy-substituted divalent phenylene radicals exemplified for R above, for example, hydroxyphenylene, hydroxychlorophenylene, hydroxytolylene, hydroxylylene, etc.; hydroxy substituted alkoxyphenylene radicals, for example, hydroxymethoxyphenylene, hydroxyethoxyphenylene, hydroxymethoxytolylene, etc.; hydroxynitrated phenylene radicals such as hydroxynitrophenylene, hydroxynitroxylylene, hydroxynitrotolylene, etc.

Radicals included by R''' and $R^1$ are alkyl groups, aryl groups, alkaryl groups, aralkyl groups and the halogenated derivatives thereof and the alkoxy derivatives thereof. The alkyl (including cycloalkyl) radicals may be, e.g., methyl, ethyl, propyl, chloropropyl, trifluoropropyl, butyl, chlorobutyl, pentyl, hexyl, octyl, octadecyl, cyclobutyl, cyclopentyl, cyclohexyl, cycloheptyl, etc. radicals; monovalent aryl radicals are, for example, phenyl, chlorophenyl, naphthyl, chloronaphthyl, etc.; alkaryl groups, for example, tolyl, trifluoromethylphenyl, xylyl methoxyphenyl, etc.; aralkyl groups, for example, benzyl, phenylethyl, chlorobenzyl, chlorophenylethyl, phenylbutyl, methoxyphenylbutyl, etc., and cyanoalkyl groups such as cyanoethyl, cyanopropyl, cyanobutyl, etc.

The hydrocarbonoxy and halogenated hydrocarbonoxy radicals included by R''' are alkoxy groups such as methoxy, ethoxy, propoxy, octadecoxy, octyloxy, chloropropoxy, trifluorobutoxy, chlorohexoxy, etc.; aryloxy groups such as phenoxy, tolyloxy, xylyloxy, chlorophenoxy, fluorophenoxy, chloroxylyloxy, trifluoromethylphenoxy, etc.

In accordance with the process of this invention, a certain class of silicon compounds is thoroughly admixed under inert conditions, e.g., in a nitrogen atmosphere with a catalyst composition comprising a basic cupric salt and pyridine or a basic cupric salt and a pyridine derivative. After thorough mixing, the admixture is exposed to air or other oxygen-containing environment and is allowed to cure at room temperature by oxidative coupling.

Other compounding ingredients such as fillers and the like can also be added during the mixing. Care must be taken to exclude air or oxygen during the mixing statge since upon exposure, the compositions of this invention undergo an irreversible oxidative polymerization to produce novel crosslinked resins and elastomers. As has been previously set forth, the oxidative polymerization takes place easily and rapidly at ambient temperatures (i.e., 10° C. to 35° C.) and therefore, there is no need for additional heating in the process of the present invention, although by heating the compositions, one can cause a more rapid curing to take place.

The catalysts which are useful in producing the compositions of this invention comprise the complex of a basic cupric salt and a pyridine or pyridine derivative. The particular copper salt employed has no effect on the type of product obtained. One can employ either a cupric or cuprous salt and also copper metal which is oxidized in situ to a cupric salt. The only requirement is that, if a cuprous salt is used, it must be capable of existing in the cupric state and must form a complex with the pyridine or pyridine derivative which is soluble in the reaction medium. The preparation of the basic cupric salt-pyridine complex or basic cupric salt-substituted pyridine complex is more fully set forth in copending application Ser. No. 212,128, filed July 24, 1962, now U.S. Patent 3,306,875 and assigned to the same assignee as the present invention, which application is made part hereof by reference thereto.

Typical examples of the copper salt suitable for the preparation of the basic copper salt-pyridine complex catalyst useful in the process of this invention are cuprous chloride, cupric chloride, cuprous bromide, cupric bromide, cuprous sulfate, cupric sulfate, cuprous azide, cupric azide, cuprous tetraamine sulfate, cupric tetraamine sulfate, cuprous acetate, cupric acetate, cuprous propionate, cupric butyrate, cuprous palmitate, cupric laurate, cuprous benzoate, cupric toluate and other cuprous and cupric salts of organic fatty acids.

Illustrative of the pyridines and substituted pyridines which are useful in preparing the basic copper salt pyridine complex catalyst employed in the process of this invention include pyridine; $\alpha$, $\beta$ and $\delta$-collidines, $\alpha$, $\beta$ and $\delta$-picoline; 2,4-, 2,5-, 2,6- and 3,4-lutidine; quinuclidine, the dipyridyls, 3-5-diphenylpyridine, etc.; the alkyl-substituted pyridine, such as ethylpyridine, diethylpyridine and the like; isoquinoline, quinoline, $\beta$-phenylpyridine, $\beta$-nitropyridine, the alkyl-substituted quinolines and the like, pyridazine, pyrimidine, pyrazine, and the like. The only limiting factor on pyridine or pyridine derivative is that it form a basic copper salt complex which is soluble to some extent in the reaction medium, i.e., the organosilicon composition. The higher the solubility of such complex, the faster the oxidation takes place to give the products of this invention.

The amount of the basic copper salt-pyridine complex catalyst employed in producing the compositions of this invention is not narrowly critical and can be from 0.01 to 10 parts by weight of the copper-amine complex catalyst per 100 parts by weight of the starting hydroxyaryl containing silicon compound. Higher amounts of the catalyst can be employed; however, the rate of cure becomes too fast for normal applications and usage. Lower amounts of the catalyst can also be employed; however, the curing rate is reduced but can be accelerated by heat.

The temperature at which the process of the present invention is conducted is not narrowly critical and can be from about 0° C. to as high as 100° C. or even higher. It is of course obvious to those skilled in the art that the rate of reaction varies with temperature and therefore, temperatures in the neighborhood of 0° C. will cause a slow reaction, whereas temperatures in the range of about 100° C. will cause very fast curing. It is for this reason that it is preferred to employ temperatures in the range of from about 10° C. to about 35° C. Temperatures in this range are normally called "room temperature."

It is preferred to conduct the process of the present invention at atmospheric pressure for ease and simplicity of operation. Since oxygen is a necessary ingredient to the present invention, it is obvious that by using lower pressures, less oxygen will be available thereby causing a slower reaction rate; when super-atmospheric pressures are used, a correspondingly larger amount of oxygen would be available resulting in faster cure rates.

While a filler is not necessary to form the room temperature curing compositions of this invention, a filler can be employed, if desired, to give higher tensile strength to the elastomers produced.

The fillers, which can be employed in producing the compositions of this invention, are any of those commonly employed in the art and include, for example, titanium dioxide, alumina, silica of the fumed or the precipitated type, calcium carbonate, diatomaceous earth, silica aerogel, carbon black and the like. When employing carbon black as a filler, it is usually employed in combination with other fillers and is preferably not present in amounts of more than about 50% by weight of the total filler present. It is preferred that at least 50% by weight of the total filler constitute a finely divided silica.

The amount of the filler employed in the compositions of this invention can vary from about 1 to 200 parts by weight per 100 parts by weight of the hydroxyaryl containing silicon compound employed in producing the compositions of this invention. It is preferred to employ the filler in amounts of from about 20 to 60 parts by weight filler per 100 parts by weight of the hydroxyaryl containing silicon compound.

The silicon compounds which can be employed as starting materials of the present invention include silanes of the formula (V) $\quad R'''_{4-d}$—Si—$(R'$—R—OH$)_d$ siloxanes of the formula (VI) 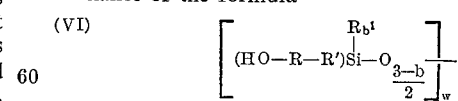

and copolymeric siloxanes of the formula (VII) 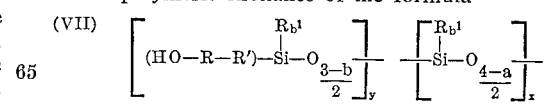

wherein R, R', R''', R$^1$, $a$, $b$, $d$, $y$ and $x$ have the above-defined meanings, and $w$ is an integer of at least 1.

The above-identified silicon compounds wherein R' is a $C_nH_{2n}$ group where $n$ is equal to 3 or more are prepared by the addition of silicon compounds containing silanic hydrogen with unsaturated phenols such as allylphenol, 2-allyl-4-methylphenol, eugenol and the like, employing a platinum catalyst. These silicon compounds and methods for their preparation are more fully described in copending application, Serial No. 526,971, Karl W. Krantz, filed Feb. 10, 1966, and assigned to the same assignee as the present invention which application by reference is made a part hereof. Other silicon compounds employed in the process of this invention can be produced by the Grignard reaction in accordance with procedures known to those in the art.

The room temperature air-curable organosilicon compounds of this invention are useful as encapsulating agents, caulking compositions and the like.

In order that those skilled in the art may be better able to practice this invention, the following examples are given by way of illustration and not by way of limitation. All parts are by weight unless otherwise expressly set forth.

Example 1

Symmetrical tetra[gamma - (3 - methoxy-4-hydroxyphenyl)propyltetramethylcyclotetrasiloxane of the formula (VIII)
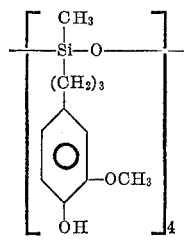

(prepared by the addition of eugenol to symmetrical tetramethyltetrahydrocyclotetrasiloxane employing a platinum catalyst), one part by volume was dissolved in 5 parts of pyridine. The solution was divided into two parts, labeled solution A and solution B. To solution A was added cuprous chloride (0.01 part). Solutions A and B were heated to 120° C. for 2 minutes in a nitrogen atmosphere and cooled to room temperature.

Solutions A and B were spread as a thin film on separate 3" x 1" glass slides and exposed to air. Within 5 minutes a solid coherent film formed from solution A while solution B (not containing copper) remained a liquid. After 12 hours, solution A had formed a hard, tough, tack-free film, whereas solution B still remained a liquid.

Example 2

In a second test, a copper slab and an aluminum plate were dipped into solution B from Example 1. The excess varnish was allowed to drain and both bars were heated to 100° C. in air for 10 minutes. The bars were then cooled to room temperature and rinsed with acetone. The copper bar was found to be cooled with a tough insulating film whereas no insulating film formed on the aluminum bar. This test shows the catalytic effect of the surface copper together with the amine (pyridine) to cure hydroxyaryl-containing organosilicon compounds.

Example 3

Three separate samples of a silicone gum (2 grams each) having the average formula (IX)
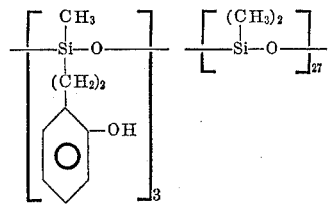

(prepared by the addition of 2-allylphenol to a siloxane gum having the average formula (X)
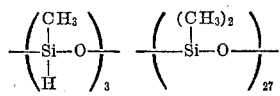

employing a platinum catalyst) were mixed with 0.1, 0.3 and 0.5 ml, respectively, of a solution of 0.5 gm. cuprous chloride in 5 ml. pyridine. The mixtures were coated on glass slides and the coated glass slides were exposed to the air causing the coatings to cure to tough films. The rate of cure was directly proportional to the catalyst concentration, i.e., the higher the catalyst concentration, the higher the cure rate. When control samples were coated onto glass slides and the coated slides kept in an atmosphere of nitrogen, no curing took place. This shows that oxygen is necessary to the cure.

Example 4

Three separate samples of a silicone gum (2 grams each sample) having the average formula (XI)
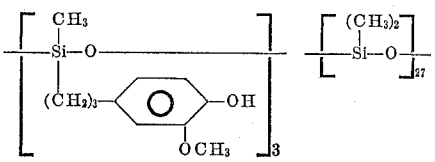

(prepared by the addition of eugenol to a siloxane gum having the average formula (X)
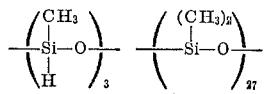

employing a platinum catalyst) were mixed 0.1, 0.3 and 0.5 ml. of a solution of .05 gram of cuprous chloride in 10 ml. of pyridine. The mixtures were coated on glass slides. The coated glass slides were then exposed to air and the coating allowed to cure to give tough, flexible films. The rate of cure was directly proportional to the catalyst concentration, i.e., the higher the catalyst concentration, the higher the cure rate. When control samples were kept under nitrogen, no curing took place.

Example 5

Three separate samples of a silicone gum (each sample 2 grams) having the average formula (XII)
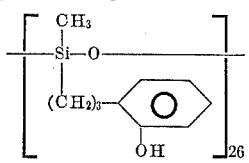

(prepared by the addition of 2-allylphenol to a siloxane gum having the average formula (XIII)
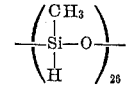

employing a platinum catalyst) were mixed with 0.1, 0.3 and 0.5 ml. of a solution of 0.5 gram of cuprous chloride in 5 ml. of pyridine. The mixtures were coated on glass slides and the coated glass slides were exposed to the air to effect curing of the coating to tough, flexible films. The rate of cure was directly proportional to the catalyst concentration, i.e., the higher the catalyst concentration, the higher the cure rate. When the glass slides were kept under an atmosphere of nitrogen, no curing took place.

Example 6

A silicone gum having the average formula (XIV)
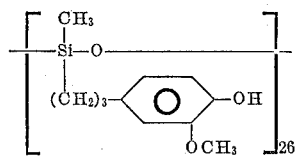

(prepared by the addition of eugenol to a siloxane gum having the average formula XIII. 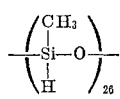

employing a platinum catalyst) (2 grams) was mixed with 0.1 ml. of the solution of cuprous chloride in pyridine shown in Example 5. The mixture was then coated on a glass slide and the slide exposed to air. There resulted a cured coating on the glass slide. When the coated glass slide was kept in an atmosphere of nitrogen, no curing took place.

Example 7

Three separate samples of a silicone resin (2 grams each) having the average formula XV. 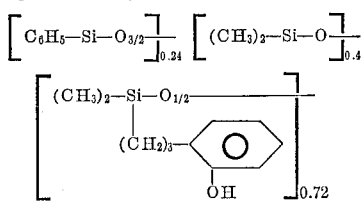

(prepared by the addition of 2-allylphenol to a siloxane resin having the average formula XVI. 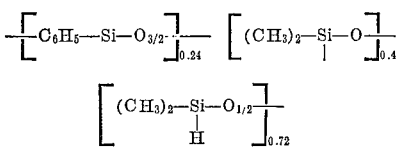

employing a platinum catalyst) were mixed with 0.1, 0.3 and 0.5 ml. of the cuprous chloride pyridine solution as set forth in Example 5. When the mixtures were coated onto a glass slide and then exposed to the air, a cured coating formed on the glass slide. The curing rate was directly proportional to the catalyst concentration, i.e., the higher the catalyst concentration, the faster the cure rate. When control samples were coated in the same manner and the slides kept in an atmosphere of nitrogen, no curing took place.

Example 8

A silicone resin having the average formula

XVII. 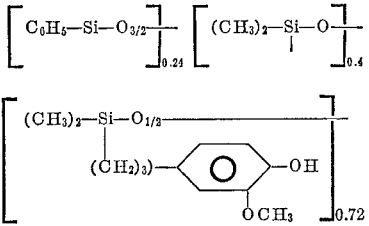

(prepared by the addition of eugenol to a siloxane resin having the average formula

XVI.

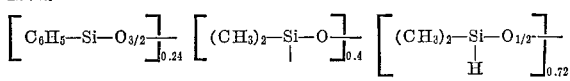

employing a platinum catalyst) was treated in the same manner as Example 7. When the coated glass slides were exposed to air, the resin cured to a solid infusible product. When the glass slides were kept in an atmosphere of nitrogen, no curing took place.

Example 9

A high molecular weight dimethyl silicone gum having the average formula

XVIII. 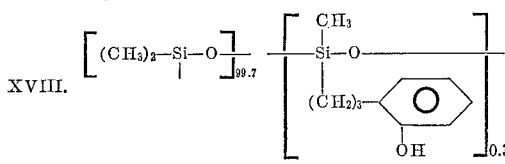

(prepared by the addition of 2-allylphenol to a siloxane gum having the average formula XIX. 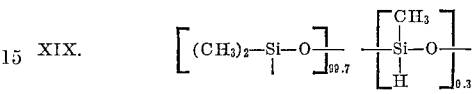

employing a platinum catalyst) was treated in accordance with the procedure of Example 3. When the mixture was coated onto a glass slide and the coated slide exposed to air, there resulted a cured, rubbery coating on the glass slide. When the coated glass slides were kept in an atmosphere of nitrogen, no curing took place.

Example 10

In this example, the organosilicon compounds shown in Examples 3 through 8 were employed in accordance with the following standard procedure. The organosilicon compounds were dissolved in acetone with a ratio of 1 volume of the organosilicon compound to 4 volumes of acetone. This solution was then applied as a thin coat to a piece of 2 inch by 1 inch metal sheet. The coated metal sheet was placed in a beaker and allowed to drain onto filter paper. Pyridine was brought into contact with the reaction zone in two ways. In method A, the pyridine was added to the acetone solution prior to the application. In method B, the pyridine was introduced as a vapor by soaking the filter paper with pyridine and allowing the pyridine to vaporize onto the coated metal sheet. When copper was the metal employed, all compositions in the presence of pyridine compounds cured to hard, dark brown, glossy, insoluble films within 15 minutes at room temperature. The cure was slightly faster when the pyridine was added by method A, as compared to method B. The quality of the film, however, was better with method B, i.e., the film adhered better to the copper plate and was less colored. The cures were also obtained on brass, but in control runs on stainless steel and aluminum, the resins remained sticky liquids several days after application.

Example 11

A high molecular weight silicone gum having the average formula

XX. 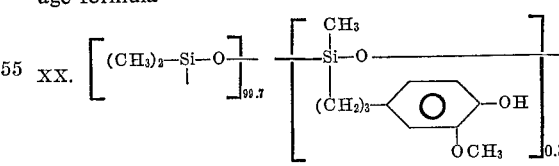

(prepared by the addtion of eugenol to a siloxane gum having the average formula XXI. 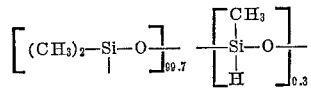

employing a platinum catalyst) was diluted with an equal volume of toluene. To the toluene solution were added 2-(methoxyethyl)pyridine (2.0 wt.%) and cuprous chloride (0.5 wt.%). The mixture was stirred under nitrogen with gentle heating (about 60° C.) for approximately five minutes. The mixture was allowed to cool to room temperature and was then divided into two equal portions. Portion A was poured into an aluminum tray to a depth of ⅛″ and exposed to the air. Within 15 minutes portion A had cured to a slab of tack-free rubber which could easily be peeled from the tray. Portion B of the mixture was stored under nitrogen and after 5 days remained a mobile fluid. After 5 days under nitrogen, portion B was exposed to the air and cured to a tack-free rubber within 15 minutes.

Example 12

4 - hydroxyphenylpropyltriethoxysilane (1 part) (prepared by the reaction of triethoxysilane with 4-allylphenol in the presence of a platinum catalyst) was dissolved in pyridine (5 parts) and cuprous chloride (0.01 parts) added with stirring in a nitrogen atmosphere. The mixture was heated to 120° C. for 2 minutes in a nitrogen atmosphere and then cooled to room temperature. When this solution is exposed to the air, a polymer is produced by oxidative coupling.

What I claim as new and desire to secure by Letters Patent of the United States is:

1. A composition of matter stable in the absence of air which cures when exposed to air comprising (1) 100 parts, by weight, of a silicon compound selected from the class consisting of silanes of the formula

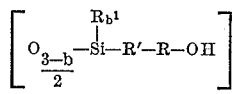

and copolymeric siloxanes having units of the formula

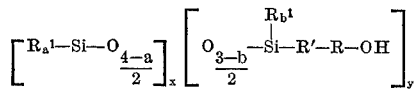

wherein R is a phenylene group or a substituted phenylene group containing at least one nuclear hydrogen, R' is a $-C_nH^2{}_n-$ group where $n$ is an integer of 0 or higher, R''' is a monovalent hydrocarbon radical, a halogenated monovalent hydrocarbon radical, a cyanoalkyl radical, a monovalent hydrocarboxy radical, or a monovalent halogenated hydrocarbonoxy radical, $R^1$ is a monovalent hydrocarbon radical, a halogenated monovalent hydrocarbon radical, or a cyanoalkyl group, R, R', R''' and $R^1$ being free of aliphatic unsaturation, $a$ is an integer of from 1 to 3, $b$ is an integer of from 0 to 2, $d$ is an integer of from 1 to 3 and $x$ and $y$ are integers having a value of at least 1, and (2) from 0.01 to 10 parts, by weight, based on the weight of (1), of a pyridine-basic copper salt complex or substituted pyridine-basic copper salt complex, said complex being soluble in said silicon compound.

2. A composition as in claim 1 which also contains from 1 to 200 parts, by weight, of a filler.

3. The air-cured composition of claim 1.

4. The air-cured composition of claim 2.

5. A composition of matter stable in the absence of air which cures on exposure to air comprising (1) 100 parts by weight, of a silicon compound selected from the class consisting of (a) silanes of the formula

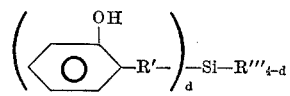

(b) siloxanes having units of the formula

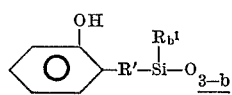

and (c) copolymeric siloxanes having units of the formula

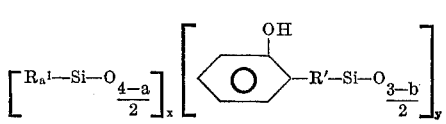

wherein R' is a divalent alkylene group containing at least three carbon atoms, R''' is a member of the class consisting of monovalent hydrocarbon radicals, halogenated monovalent hydrocarbon radicals, monovalent hydrocarbonoxy radicals, halogenated monovalent hydrocarbonoxy radicals and cyanoalkyl groups, $R^1$ is a member of the class consisting of monovalent hydrocarbon radicals, halogenated monovalent hydrocarbon radicals and cyanoalkyl groups, R''' and $R^1$ being free of aliphatic unsaturation, $a$ is an integer of from 1 to 3, $b$ is an integer of from 0 to 2, $d$ is an integer of from 1 to 3, and $x$ and $y$ are integers having a value of at least 1, and (2) from 0.01 to 10 parts, by weight, based on the weight of (1), of a pyridine-basic cupric salt complex, said complex being soluble in said silicon compound.

6. A composition of matter selected from the class consisting of (a) Silanes of the formula

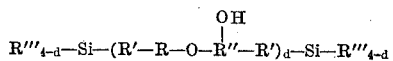

(b) Siloxanes containing units of the formula

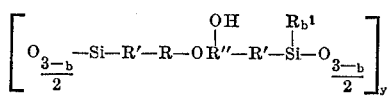

and (c) Copolymeric siloxanes containing units of the formula

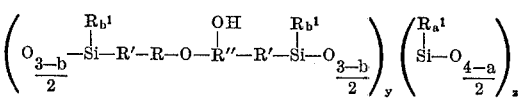

wherein R is a phenylene or substituted phenylene group, R' is a $-C_nH_{2n}-$ group, where $n$ is 0 or higher, R'' is a phenylene or substituted phenylene group, R''' is a monovalent hydrocarbon radical, a halogenated monovalent hydrocarbon radical, a cyanoalkyl radical, a monovalent hydrocrbonoxy radical, or a halogenated monovalent hydrocarbonoxy radical, $R^1$ is a monovalent hydrocarbon radical, a monovalent hydrogenated hydrocarbon radical or a cyanoalkyl radical, R, R'', R''' and $R^1$ being free of aliphatic unsaturation, $a$ is an integer of from 1 to 3, $b$ is an integer of from 0 to 2, $d$ is an integer of from 1 to 3, $y$ is an integer having a value of at least 1 and $x$ and $z$ are integers having a value of at least 0, the sum of $x+z$ being at least 1.

7. A process for the production of an air-cured composition of matter which comprises forming an admixture of (1) 100 parts, by weight, of a silicon compound selected from the class consisting of silanes of the formula

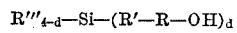

siloxanes having units of the formula

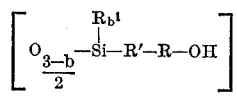

and copolymeric siloxanes having units of the formula

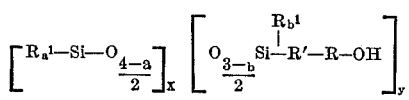

wherein R is a phenylene group or a substituted phenylene group containing at least one nuclear hydrogen, R' is a $-C_nH_{2n}-$ group where $n$ is an integer of 0 or higher, R''' is a monovalent hydrocarbon radical, a halogenated monovalent hydrocarbon radical, a cyanoalkyl radical, a monovalent hydrocarboxy radical, or a monovalent halogenated hydrocarbonoxy radical, $R^1$ is a monovalent hydrocarbon radical, a halogenated monovalent hydrocarbon radical, or a cyanoalkyl group, R, R', R''' and $R^1$ being free of aliphatic unsaturation, $a$ is an integer of from 1 to 3, $b$ is an integer of from 0 to 2, $d$ is an integer of from 1 to 3 and $x$ and $y$ are integers having a value of at least 1, and (2) from 0.01 to 10 parts, by weight, based on the weight of (1), of a pyridine-basic copper salt complex or substituted pyridine-basic copper salt complex, said complex being soluble in said silicon compound, and exposing said admixture to air.

8. A process as claimed in claim 7 where said silicon compound is a siloxane having the formula

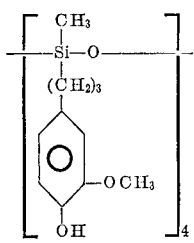

9. A process as claimed in claim 7 where said silicon compound is a copolymeric siloxane having the formula

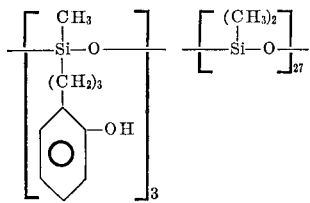

10. A process as claimed in claim 7 wherein said arylolsilicon compound is an arylolsiloxane having the formula

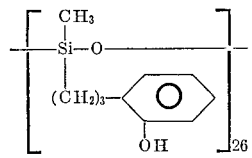

11. A process as claimed in claim 7 wherein said silicon compound is a coploymeric siloxane having the formula

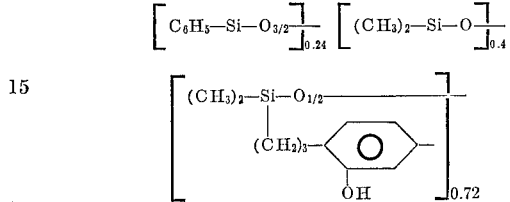

12. A process as claimed in claim 7 wherein said silicon compound is a copolymeric siloxane gum having the formula

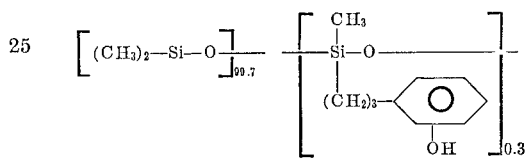

References Cited

UNITED STATES PATENTS 3,306,875   2/1967   Hay _____ 260—47

DONALD E. CZAJA, *Primary Examiner.*

M. I. MARQUIS, *Assistant Examiner.*